A. ROSENTHAL.
HUSKING ROLLS.
APPLICATION FILED DEC. 15, 1905.
927,814.
Patented July 13, 1909.
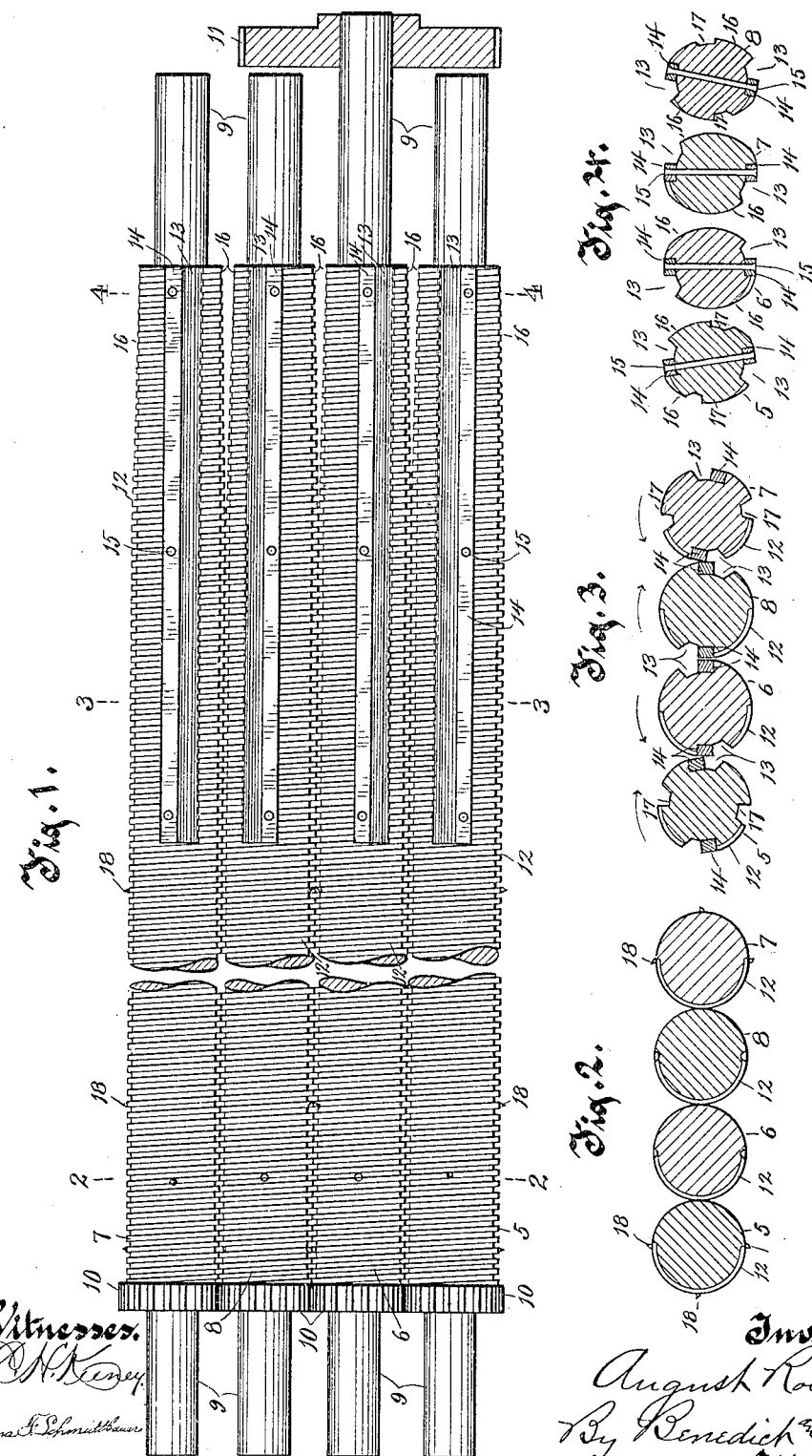

UNITED STATES PATENT OFFICE.

AUGUST ROSENTHAL, OF WEST ALLIS, WISCONSIN, ASSIGNOR TO ROSENTHAL MANUFACTURING COMPANY, OF WEST ALLIS, WISCONSIN, A CORPORATION OF WISCONSIN.

HUSKING-ROLL.

No. 927,814.  Specification of Letters Patent.  Patented July 13, 1909.

Application filed December 15, 1905. Serial No. 291,809.

*To all whom it may concern:*

Be it known that I, AUGUST ROSENTHAL, residing in West Allis, in the county of Milwaukee and State of Wisconsin, have invented new and useful Improvements in Husking-Rolls, of which the following is a description, reference being had to the accompanying drawings, which are a part of this specification.

My invention has relation to improvements in corn-husking rolls.

One of the objects of the invention is to provide an improved construction of rolls wherein a most effective and positive severing of the stalks from the ears is secured.

A further object resides in the provision of a construction whereby the ends of the short ears of corn, or so-called nubbins, are prevented from being caught and held between the rolls a sufficient length of time to clog the said rolls and prevent effective action thereof, the construction of the rolls being such that when the ends of the short ears or nubbins are carried between the rolls, the said ends are broken and crushed to such an extent as to permit the husking pins to readily effect their function of husking or tearing off the husks from the ears.

With the above, and other incidental, objects in view, the invention consists of the devices and parts, or their equivalents, as hereinafter set forth.

In the accompanying drawing, Figure 1 is a plan view of a series of rolls embodying my invention; Fig. 2 is a cross section on the line 2—2 of Fig. 1; Fig. 3 is a cross section on the line 3—3 of Fig. 1; and Fig. 4 is a cross section on the line 4—4 of Fig. 1.

My improved form of husking rolls is designed more especially for use in connection with a corn-husking and shredding machine in which the corn is fed to the rolls in such manner that the forward ends of the rolls first grasp the stalks and break or sever said stalks from the ears, the severed stalks being then carried between the rolls to shredding mechanism (not shown), which mechanism breaks and shreds the stalks into a number of pieces, the shredded portions being finally conducted out of the machine, and the ears of corn which are left on top of the rolls sliding down said rolls and being acted upon by husking mechanism which tears the husks from the ears, the said husks when so torn from the ears passing between the rolls and being acted upon by the shredding mechanism, as in the case of the stalks, while the ears of corn stripped of their husks slide down the rolls and are discharged off of the rear ends of said rolls.

Referring to the drawing, the numerals 5 and 6 indicate two of the rolls of one pair, and 7 and 8 two of the rolls of another pair. The rolls are provided at opposite ends with journals 9 which are mounted in suitable bearings in the frame work of the machine. All the journals at one end have gear wheels 10 mounted thereon which mesh with each other. One of the rolls may be positively driven in any desirable manner, and in the drawing I show one of the journals at one end of one of the rolls extended, and on this extended journal is mounted a gear wheel 11, which is driven by any suitable system of gearing. When the driven roll is rotated, rotation will of course be imparted to the other rolls by means of the intermeshing gears 10 in such manner that rolls 5 and 6 will rotate toward each other, and rolls 7 and 8 toward each other. Each one of the rolls is provided throughout its length with a spiral thread 12, the threads of the several rolls running in the same direction.

The right hand ends of the rolls are the ends to which the corn-stalks and attached ears are initially fed. Each one of the rolls from the right hand end thereof rearwardly for a desired distance is provided with oppositely arranged surface recesses 13. Within these recesses 13 are disposed metallic bars 14. It is desirable, in order to secure the best results that the bars be so set and secured in the recesses that the advancing corner of the bar of one roll of a pair will strike the bar of the other roll of the pair at an intermediate point of the said bar of the other roll. One way of accomplishing this is to have the bar in one recess fit against the shoulder at one end of said recess, and the bar in the other recess fit against the end shoulder which is opposite to the shoulder against which the bar in the other recess fits. The same object can, of course be secured by setting the gears 10 in different relations to each other. The bars are detachably held in place by means of bolts 15. These bolts provide for the removability of the bars when the acting corners of said bars become worn and it is desired to present a new corner of a bar for action, or to substitute a new bar in place of the old one.

In order to give the butts or ends of the stalks an opportunity to initially pass between the rolls, I form diametrically opposite faces of the forward or right hand ends of the rolls into flattened or less rounded surfaces 16, which surfaces start from a desired point rearwardly of the rolls and gradually taper forwardly, so that at the extreme forward ends of the rolls the spaces between these flattened surfaces is the greatest. From the fact that the two inner rolls rotate in a direction away from each other, the stalks are not carried between these two rolls, but said stalks pass between each outside roll and the inner roll adjacent thereto.

By the provision of the recesses 13, the ends of the corn-stalks are more effectually caught between the two pair of rolls (5—6 and 7—8) and carried therebetween to a point below the rolls, where they may be acted upon by shredding mechanism. The angles formed at the corners of these recesses are the active portions which engage the stalks and pull the said stalks between the rolls, and if no provision were made these active corners would, with continued use of the rolls, wear away, and thereby impair the efficiency of the rolls. It is for this reason that I provide the bars 14 which are secured in the recesses and are preferably fitted against the active corners of the recesses. The wear, therefore, comes on the angles of these bars, and when these angles become worn to such an extent as to impair their efficiency, the bolts 15 can be removed, and the bar either readjusted so as to present a new angle or corner, or a new bar may be substituted.

From the fact that the bars 14 are preferably set in their respective recesses, so that the advancing corner of one bar, in the rotation of the rolls of a pair toward each other will strike the bar of the other roll at an intermediate point, a shearing action is produced which serves to effectually grasp the stalks, as well as to break the same and crush and sever them from the ears.

It will be seen that in addition to the recesses 13, the outside rolls have other oppositely disposed recesses 17. These extra recesses are not absolutely necessary, but by the provision thereof an additional gripping effect on the stalks is secured. There is no particular necessity for arranging the bars 14 in these extra grooves, inasmuch as the wear on said grooves is not as great as in the case of the grooves 13. Also, these extra grooves are not provided for the inner rolls, inasmuch as if provided they would have a tendency to draw the corn-stalks around and upwardly between the two inner rolls.

After the ears of corn are severed from the stalks, the said ears slide down the rolls, as previously pointed out, and are acted upon by the husking mechanism. In the case of socalled nubbins or small ears of corn, the ends thereof are apt to become wedged in between the rolls and cause a clogging of the mechanism. It is, therefore, important to provide means whereby if the ends of any of these short ears should be caught between the rolls, the said ends may be broken and crushed so as to give the husking pins an opportunity to completely tear off the husks from the ears. In some forms of rolls, a series of ribs have been provided around the rolls for the purpose of accomplishing the function referred to. This construction has not been attended with entirely satisfactory results, inasmuch as the ribs form pockets therebetween into which the ends of the nubbins pass, and consequently the ribs are prevented from crushing and breaking the ends of the nubbins. In my improved construction, however, wherein the rolls are provided longitudinally with spiral threads, the thread of one roll, in the rotation of the rolls, may be said to be advancing in one direction, while the thread of the adjacent roll is advancing in the opposite direction; or, in other words, the line of the thread of one roll is constantly crossing the line of the thread of the other roll, with the result that the ends of the nubbins are caught between the threads and broken and crushed, and in this manner the husking mechanism is permitted to readily tear the complete husks from off the ears, the said husks then passing between the rolls.

In order to accomplish the husking operation, I provide each of the rolls with a series of husking pins 18.

While I have herein shown and described two pair of husking rolls, yet I do not wish to be understood as limiting myself thereto, inasmuch as only one pair may be used, or more than two pair, without departing from the spirit and scope of my invention.

What I claim as my invention is:

1. A pair of husking rolls constructed to be rotated toward each other, and provided longitudinally with spiral threads, arranged so that the thread of one roll is advancing in the opposite direction to the thread of the adjacent roll, means for rotating said rolls, and bars flush with the periphery of said threads connected to said rolls.

2. A pair of husking rolls constructed to be rotated toward each other, and provided longitudinally with spiral threads, arranged so that the thread of one roll is advancing in the opposite direction to the thread of the adjacent roll, means for rotating said rolls, bars flush with the periphery of said threads connected to said rolls, and other means on the rolls for stripping ears of their husks.

3. A pair of husking rolls, means for rotating said rolls toward each other, and having the forward portions thereof provided with oppositely arranged flattened or but slightly rounded surfaces, said surfaces starting at a point removed from the forward ends of the rolls and continuing forwardly at a taper, whereby the greatest spaces between the flattened surfaces are at the forward ends of the rolls, means on the forward portions of the rolls for separating the stalks from the ears, and means on the rear portions of the rolls for stripping the ears of their husks.

4. A pair of husking rolls, means for rotating said rolls toward each other, and having bars disposed in recesses in said rolls, and the forward portions of the rolls provided with oppositely arranged flattened or but slightly rounded surfaces, said surfaces starting at a point removed from the forward ends of the rolls and continuing forwardly at a taper, whereby the greatest spaces between the rolls are at the forward ends thereof, means for holding the bars in the recesses, and means on the rear portions of the rolls for stripping the ears of their husks.

5. A pair of husking rolls, means for rotating said rolls toward each other, each roll provided longitudinally with a spiral thread, and also provided with projecting husking pins and bars, said bars disposed in recesses formed crosswise to the thread.

6. A pair of husking rolls, means for rotating said rolls toward each other, said rolls having their forward portions provided longitudinally with recesses, and each roll provided longitudinally with a spiral thread, bars disposed in the recesses, means for holding the bars in the recesses, and means on the rear portions of the rolls for stripping the ears of their husks.

7. A pair of husking rolls, means for rotating said rolls toward each other, the forward portions of said rolls provided with oppositely arranged flattened or but slightly rounded surfaces, said surfaces starting at a point removed from the forward ends of the rolls and continuing forwardly at a taper, whereby the greatest spaces between the flattened surfaces are at the forward ends of the rolls, and each of said rolls also provided longitudinally with a spiral thread, means on the forward portions of the rolls for separating the stalks from the ears, and means on the rear portions of the rolls for stripping the ears of their husks.

8. A pair of husking rolls, means for rotating said rolls toward each other, said rolls provided longitudinally with recesses, and the forward portions of said rolls also provided with oppositely arranged flattened or but slightly rounded surfaces, said surfaces starting at a point removed from the forward ends of the rolls and continuing forwardly at a taper, whereby the greatest spaces between the rolls are at the forward ends thereof, and each of said rolls also provided longitudinally with a spiral thread, bars disposed in the recesses of the rolls, means for holding the bars in the recesses, and means on the rear portions of the rolls for stripping the ears of their husks.

9. A husking roll provided longitudinally with a spiral thread, and also provided longitudinally with oppositely arranged recesses, bars disposed in said recesses, and means for holding the bars in the recesses.

10. A husking roll provided longitudinally with oppositely arranged flattened or but slightly rounded surfaces, said surfaces starting at a point removed from the forward end of the roll and continuing forwardly at a taper.

11. A husking roll provided longitudinally with a spiral thread, and also provided longitudinally with oppositely arranged flattened or but slightly rounded surfaces, said surfaces starting at a point removed from the forward end of the roll and continuing forwardly at a taper.

12. A husking roll provided longitudinally with a spiral thread and also provided longitudinally with oppositely arranged flattened or but slightly rounded surfaces, said surfaces starting at a point removed from the forward end of the roll and continuing forwardly at a taper, and said roll further provided longitudinally with oppositely arranged recesses, bars disposed in said recesses, and means for holding the bars in the recesses.

13. A pair of husking rolls, means for rotating said rolls toward each other, said rolls having the forward portions thereof provided longitudinally with recesses, bars disposed in said recesses, the bar in one recess of each roll being arranged against one of the side shoulders of said recess, and the bar in the other recess being arranged against the opposite side shoulders of said other recess, means for holding the bars in said recesses and against the shoulders thereof, and means on the rear portions of the rolls for stripping the ears of their husks.

14. A pair of husking rolls, means for rotating said rolls toward each other, said rolls having the forward portions thereof provided longitudinally with recesses, bars disposed in said recesses, the bar in one recess being so set therein that its advance edge, as the rollers rotate toward each other, will contact with the bar of the other recess at substantially an intermediate point of said bar of the other recess, means for holding the bars in the recesses and means on the rear portions of the rolls for stripping the ears of their husks.

In testimony whereof, I affix my signature, in presence of two witnesses.

AUGUST ROSENTHAL.

Witnesses:
 A. L. MORSELL,
 ANNA F. SCHMIDTBAUER.